(12) United States Patent
Fox et al.

(10) Patent No.: US 10,586,190 B2
(45) Date of Patent: Mar. 10, 2020

(54) FLEET OPTIMIZATION ACROSS ONE OR MORE PRIVATE AIRCRAFT FLEETS

(71) Applicant: Stellar Labs, Inc., Palo Alto, CA (US)

(72) Inventors: David Fox, Woodside, CA (US);
Christos Katsis, San Mateo, CA (US);
Lawrence E. Doxsee, Jr., Palo Alto, CA (US); Nicoleta Neagu, Verrieres le Buisson (FR); Paul Touw, Napa Valley, CA (US); Gary Waldman, Alameda, CA (US)

(73) Assignee: Stellar Labs, Inc., Redwood City, CA (US)

( * ) Notice: Subject to any disclaimer, the term of this patent is extended or adjusted under 35 U.S.C. 154(b) by 289 days.

(21) Appl. No.: 15/449,822

(22) Filed: Mar. 3, 2017

(65) Prior Publication Data

US 2018/0101802 A1  Apr. 12, 2018

Related U.S. Application Data

(60) Provisional application No. 62/405,695, filed on Oct. 7, 2016.

(51) Int. Cl.
*G06Q 10/06* (2012.01)
*G06Q 10/02* (2012.01)
*G06Q 30/02* (2012.01)

(52) U.S. Cl.
CPC ....... *G06Q 10/06312* (2013.01); *G06Q 10/02* (2013.01); *G06Q 30/0283* (2013.01)

(58) Field of Classification Search
CPC ......... G06Q 10/06312; G06Q 30/0283; G06Q 10/02
See application file for complete search history.

(56) References Cited

U.S. PATENT DOCUMENTS

| | | | |
|---|---|---|---|
| 8,244,549 B1 | 8/2012 | Stener | |
| 2001/0044788 A1* | 11/2001 | Demir | G06Q 10/02 705/400 |
| 2005/0187677 A1 | 8/2005 | Walker | |
| 2006/0020496 A1* | 1/2006 | Azzarello | G06Q 10/02 705/5 |
| 2008/0059273 A1 | 3/2008 | Miller | |
| 2015/0154873 A1 | 6/2015 | Sawhill et al. | |
| 2017/0235316 A1* | 8/2017 | Shattil | B64C 39/024 701/3 |

OTHER PUBLICATIONS

Abara, Applying Integer Linear Programming to the Fleet Assignment Problem, Interfaces, Jul.-Aug. 1989, pp. 20-28, vol. 19, No. 4.
Barnhart et al., Flight String Models for Aircraft Fleeting and Routing, Transportation Science, Aug. 1998, pp. 208-220, vol. 32, No. 3.

(Continued)

*Primary Examiner* — A. Hunter Wilder
(74) *Attorney, Agent, or Firm* — Van Pelt, Yi & James LLP (57) ABSTRACT

A request is received to book a flight on a private aircraft. A disruption cost associated with adding the flight to a previously optimized schedule of previously booked flights is determined. A price to be quoted to book the requested flight is computed based at least in part on the disruption cost.

14 Claims, 7 Drawing Sheets

(56) References Cited

OTHER PUBLICATIONS

Barnhart et al., Optimization Approaches to Airline Industry Challenges: Airline Schedule Planning and Recovery, Dagstuhl Seminar Proceedings 09261, 2009, pp. 1-3.
Belanger et al., Weekly Airline Fleet Assignment with Homogeneity, Transportation Research Part B 40, 2006, pp. 306-318.
Clarke et al., The Aircraft Rotation Problem, Annals of Operation Research 69, 1997, pp. 33-46.
Gotz et al., Solving the Weekly Fleet Assignment Problem for Large Airlines, MIC'99—III Metaheuristics International Conference, Jul. 19-22, 1999, pp. 1-6.
Hane et al., The Fleet Assignment Problem: Solving a Large-Scale Integer Program, Mathematical Programming 70, 1995, pp. 211-232.
Rexing et al., Airline Fleet Assignment with Time Windows, Transportation Science, Feb. 2000, pp. 1-20, vol. 34, No. 1.
Rushmeier et al., Advances in the Optimization of Airline Fleet Assignment, Transportation Science, May 1997, pp. 159-169, vol. 31, No. 2.
Sakkout, Modelling and Solving Fleet Assignment in a Flexible Environment, 1996.
Sherali et al., Airline Fleet Assignment Concepts, Models, and Algorithms, European Journal of Operational Research 172, 2006, pp. 1-30.
Subramanian et al., Coldstart: Fleet Assignment at Delta Air Lines, Interfaces, Jan.-Feb. 1994, pp. 104-120, vol. 24, No. 1.
Vasel, How to Upgrade to a Private Jet for $300, CNN, Jul. 29, 2015, http://money.cnn.com/2015/07/29/luxury/delta-upgrade-private-jets/index.html?iid=ob_homepage_featured_pool&iid=obnetwork.

\* cited by examiner

FLEET OPTIMIZATION ACROSS ONE OR MORE PRIVATE AIRCRAFT FLEETS

CROSS REFERENCE TO OTHER APPLICATIONS

This application claims priority to U.S. Provisional Patent Application No. 62/405,695 entitled FLEET OPTIMIZATION ACROSS ONE OR MORE PRIVATE AIRCRAFT FLEETS filed Oct. 7, 2016 which is incorporated herein by reference for all purposes.

BACKGROUND OF THE INVENTION

The private aircraft business is different from that of commercial airlines. Private aircraft may be used for corporate and/or family customers and travel empty a large percentage of the time in comparison to commercial airlines. Private aircraft require a higher quality of service but have more flexible hours than commercial airlines. They travel empty in part because of empty relocation flights between drop off and pick up locations, and because each private aircraft fleet may have fewer aircraft than their commercial counterparts.

Assigning flights more efficiently to an private aircraft fleet, in some cases by reducing relocation, improves at least one of the following: reducing economic and ecological waste, improving resource allocation, increasing operational stability, enhancing control, and increasing quality of service.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Factoring for disruption costs in fare pricing across one or more private aircraft fleets is disclosed.

Throughout this specification, "fleet assignment" is the problem of assigning a flight to a fleet of aircraft to minimize some objective function while satisfying certain operational constraints. In one embodiment, a fleet is homogenous and an objective function is total travel time of each aircraft, wherein the constraints include maximum flying time per day and pilot curfews.

In one embodiment, private aircraft fleet planning is performed over a relatively short time horizon, for example the next three days. In one embodiment, the aircraft fleet assignment problem is addressed as a global optimization problem. In one embodiment, a goal is to minimize the total travel time realized by the whole fleet, wherein the "whole fleet" may refer to variously as a single fleet and/or a plurality of separately-owned/operated fleets. In one embodiment, the problem is defined as a multi-objective optimization problem, wherein customer preferences may be considered as one of the optimization criteria.

Throughout this specification a "customer" is a customer and/or customer agent representing an end user of a private aircraft flight. Typically, online and other markets permit a customer to purchase a flight on a private jet, wherein pricing for such a trip may be based on a set of rules. Throughout this specification a "trip" generally refers to a flight, trip, iternary, and/or leg of a trip, that is a segment of a trip, unless otherwise specified. This set of typical fare rules takes into consideration the costs of providing a requested service, for example a flight on a given day/time for a certain number of passengers between an originating location and a destination location. A rule-based approach may not take into account the cost that adding a proposed trip would have on other aspects of fleet operations.

In one embodiment, an initial optimal fleet assignment solution is determined based on a set of fares booked to date. Throughout this specification a "floating fleet server" is a server or servers to provide a marketplace and/or exchange to purchase air transportation via private aircraft across one or more operators.

Figure 1:
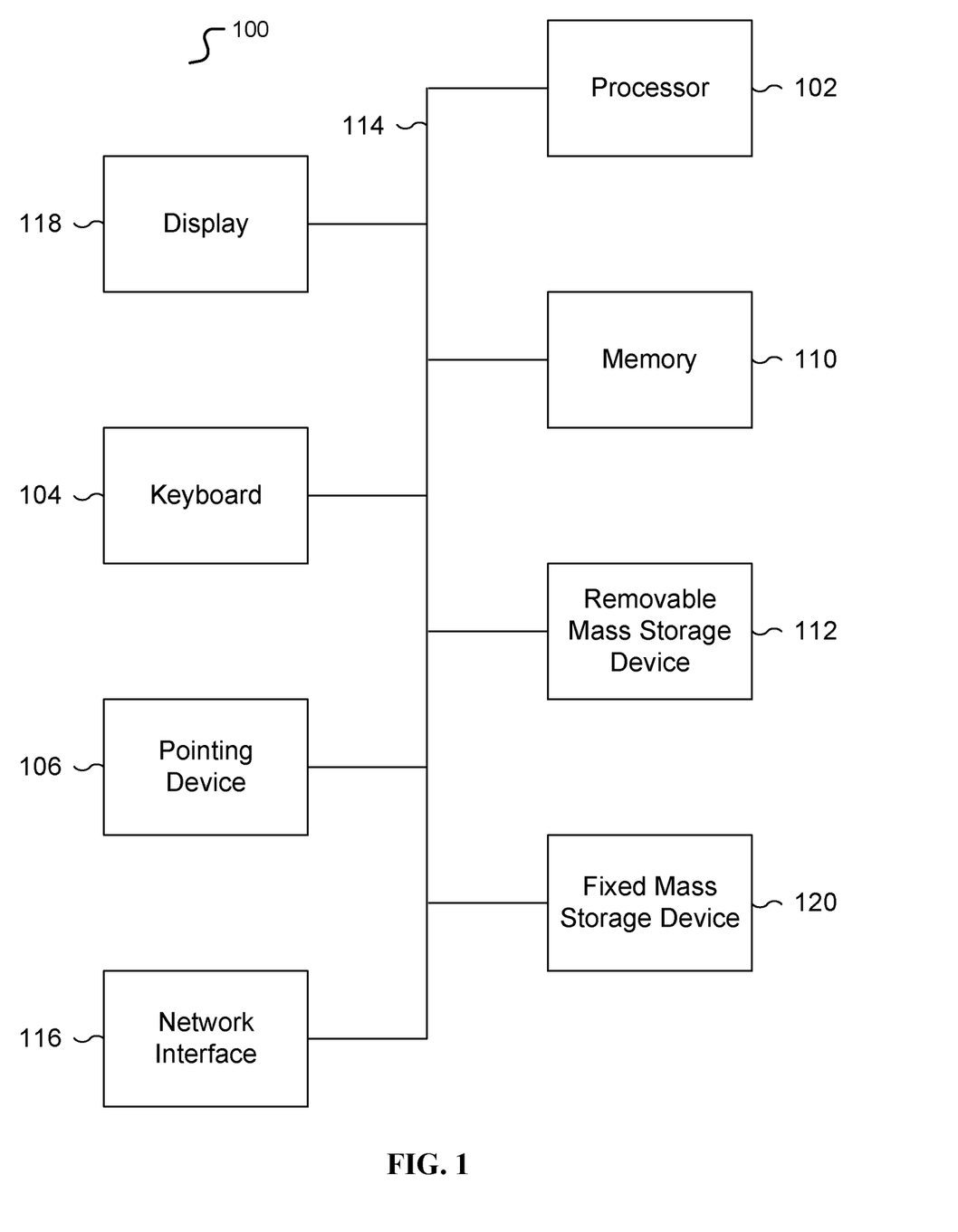
FIG. 1 is a functional diagram illustrating a programmed computer/server system for a floating fleet in accordance with some embodiments.

FIG. 1 is a functional diagram illustrating a programmed computer/server system for a floating fleet in accordance with some embodiments. As shown, FIG. 1 provides a functional diagram of a general purpose computer system programmed to provide floating fleet service in accordance with some embodiments. As will be apparent, other computer system architectures and configurations may be used for floating fleet service.

Computer system 100, which includes various subsystems as described below, includes at least one microprocessor subsystem, also referred to as a processor or a central processing unit ("CPU") 102. For example, processor 102 may be implemented by a single-chip processor or by multiple cores and/or processors or by virtual processors. In some embodiments, processor 102 is a general purpose digital processor that controls the operation of the computer system 100. Using instructions retrieved from memory 110, the processor 102 controls the reception and manipulation of input data, and the output of data on output devices, for example network interface 116 or storage 120.

Processor 102 is coupled bi-directionally with memory 110, which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 may include any suitable computer-readable storage media, described below, depending on whether, for example, data access needs to be bi-directional or uni-directional. For example, processor 102 may also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 may also include computer-readable media such as flash memory, portable mass storage devices, holographic storage devices, magnetic devices, magneto-optical devices, optical devices, and other storage devices. A fixed mass storage 120 may also, for example, provide additional data storage capacity. The most common example of mass storage 120 is an eMMC device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 may be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard and/or pointing device 104, as well as an auxiliary input/output device 106 interface, a sound card, microphone speakers, and other subsystems as needed. For example, the pointing device 104 can be a mouse, stylus, track ball, touch display, and/or tablet, and is useful for interacting with a graphical user interface.

The communication interface 116 allows processor 102 to be coupled to another computer, computer network, or telecommunications network using a network connection as shown. For example, through the communication interface 116, the processor 102 may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor 102 may be used to connect the computer system 100 to an external network and transfer data according to standard protocols. For example, various process embodiments disclosed herein may be executed on processor 102, or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor 102 through communication interface 116.

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus 114 is illustrative of any interconnection scheme serving to link the subsystems. Other computer architectures having different configurations of subsystems may also be utilized, including virtual servers.

Figure 2:
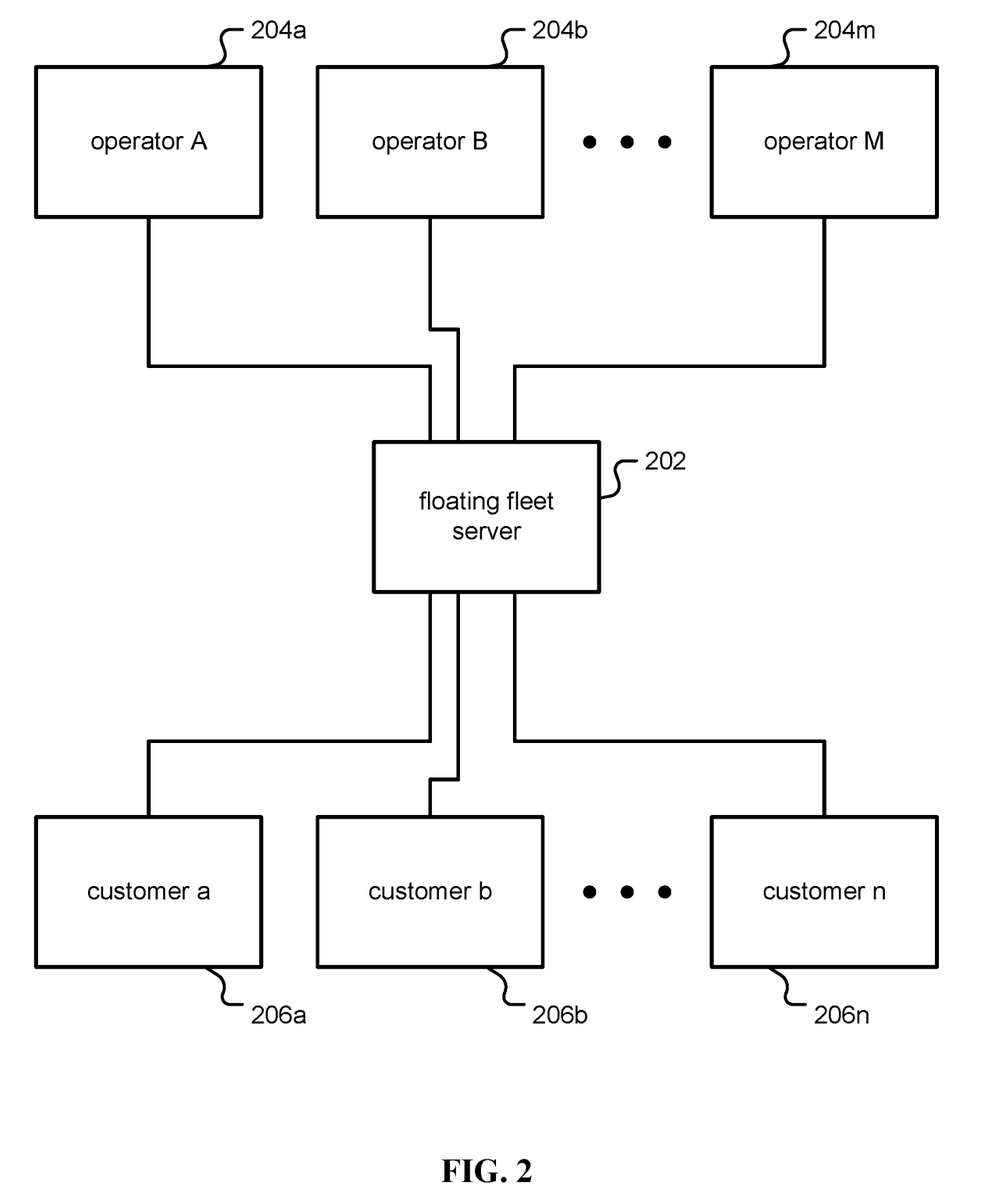
FIG. 2 is a block diagram illustrating an embodiment of a system for a floating fleet.

FIG. 2 is a block diagram illustrating an embodiment of a system for a floating fleet. In one embodiment, the floating fleet server (202) in FIG. 2 includes the server of FIG. 1.

The floating fleet server (202) is coupled to one or more customers (206) via a web-based and/or mobile app-based interface, for example as shown in FIG. 2 with customer a (206a), customer b (206b), and so on up to customer n (206n). Throughout this specification, an "operator" is any owner and/or operator of one or more private aircrafts and/or private aircraft fleets that may charter one or more flights for a customer. One or more operators (204) are coupled to the floating fleet server (202) and may indicate available inventory via a web or other interface, for example as shown in FIG. 2 with operator A (204a), operator B (204b), and so on up to operator M (204m). Pooling inventory across operators to make fleet assignment more efficient across operators is disclosed.

In one embodiment, the floating fleet server (202) accepts requests from a customer (206) for a trip and determines a solution based on availability as indicated by one or more operators (204). Prior to a request, an existing optimal fleet assignment solution across fares and operators (204) may already be determined. In one embodiment, for a request from a customer (206) leading to an incremental trip or any trip added to an existing optimal solution, a cost component associated with a "disruption" to the previously-determined optimal fleet assignment plan is determined by floating fleet server (202) or another server. This disruption cost may be directly and/or indirectly reflected in a price quoted to the requesting customer (206) for the requested trip. For example, a rule-based price may be computed, and an additional amount added to reflect the disruption and/or impact on the overall optimization, which may be global across multiple operators (204).

Figure 3:
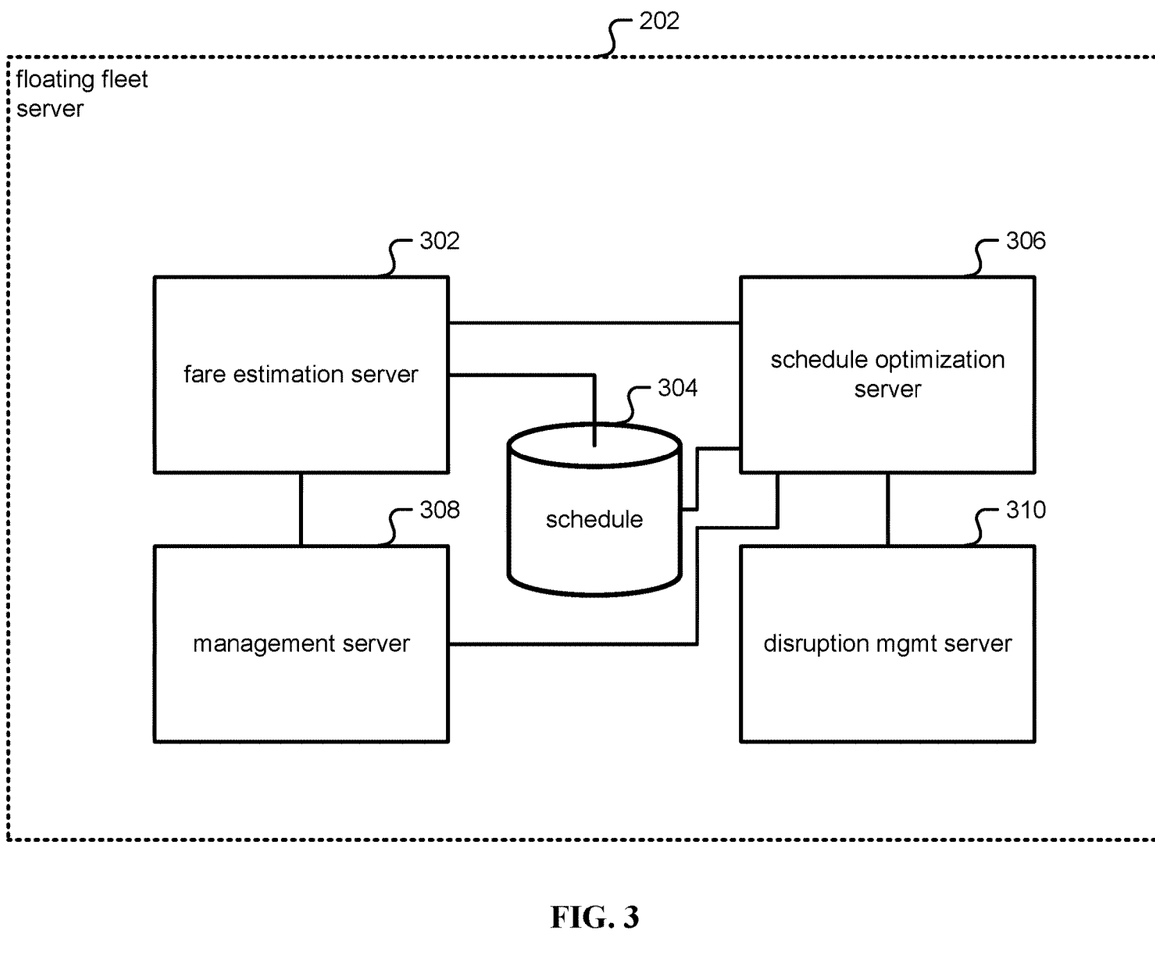
FIG. 3 is a block diagram illustrating an embodiment of a floating fleet server.

FIG. 3 is a block diagram illustrating an embodiment of a floating fleet server. In one embodiment, the server of FIG. 3 is included as server (202) of FIG. 2.

As shown in FIG. 3, floating fleet server (202) comprises one or more servers, wherein a server may include a physical server, virtual server, cloud based server, server module, server engine, and/or an application/module/engine running on one or more processors/cores/threads.

Fare estimation server (302) establishes pricing for a trip. An objective of the fare estimation server (302) is to effectively estimate a fare price based on given pricing rules and disruption cost. Fare estimation server (302) may use pricing rules and/or fare rules to establish pricing without disruption analysis. When a customer (206) orders a new trip, fare estimation server (302) is responsible to determine a price for the customer (206) and process/confirm the transaction. Fare estimation server (302) also receives and factors in a disruption cost, if any, from the schedule optimization server (306). Fare estimation server (302) also may indicate when a proposed leg and/or trip is booked to the fleet schedule store (304) for the current fleet assignment plan and/or fleet schedule across one or more operators (204).

Schedule optimization server (306) determines a fleet schedule for fleet schedule store (304). An objective of schedule optimization server (306) is to develop an optimal schedule amongst the network of operators (204) based on at least one of the following: environmental variables, available resources, customer demand, available capacity, and operational imperatives. In one embodiment, schedule optimization server (306) may compute in real-time or not in real-time the disruption cost component.

When a customer (206) orders a new trip, the new client order may trigger schedule optimization server (306) to compute a disruption cost to be transmitted to fare estimation server (302) for a real-time fare estimate/quote to fulfill the new client order. In one embodiment, fleet assignment in the schedule optimization server (306) comprises identifying schedule optimized for the total travel time and/or the cost to one or more operators. In one embodiment, fleet assignment in the schedule optimization server (306) comprises fleet and leg scheduling, preferences, and/or uncertainty management. In one embodiment, schedule optimization server (306) is responsible not only for fleet assignment but also crew scheduling and/or forecasting. In one embodiment, this forecasting includes forecasting at least one of the following: environment, resources, customer demand, price optimization, capacity, and operators. In one embodiment, crew scheduling comprises crew planning/rostering and/or uncertainty management.

Both fare estimation server (302) and schedule optimization server (306) are coupled to management server (308), wherein the management server (308) may have an objective to set fares to maximize revenue across customer segments and to effectively compete in the market. Optionally, a disruption management server (310) may be coupled to the schedule optimization server (306) to deal with uncertainty occurring in private aircraft operations. In one embodiment, disruption management server (310) may generate realistic future scenarios including aircraft dysfunction and/or aircraft delays at least in part based on historical disruption data, and/or comprise a scenarios-based approach/method to dealing with uncertainty.

In one embodiment, floating fleet server (202), fare estimation server (302) and/or schedule optimization server (306) use operations research models to generate more optimal solutions by at least one of the following: conducting and coordinating the operations, improving efficiency, and increasing productivity of economies. The server(s) may include operations research for planning comprising: schedule planning; crew planning and rostering; flight assignment and optimization; and/or resource optimization. The server(s) may include operations research for execution comprising: flight path optimization; disruption management; and/or aircraft and crew recovering. The server(s) may include operations research for marketing comprising: demand forecast; revenue management; and/or price optimization.

In one embodiment, floating fleet server (202), fare estimation server (302) and/or schedule optimization server (306) use operations planning for various stages of planning. For monthly and/or long-term planning, operations planning includes at least one of the following: a market/customers to serve; a basic schedule structure; partnerships; routes and frequencies; and initial aircraft/crew assignments. For weekly and/or medium-term planning, operations planning includes at least one of the following: fleet assignment; crew assignment/rostering; and revenue/price optimization. For daily and/or operations/short-term planning, operations planning includes at least one of the following: short-term re-fleeting; recover aircraft/schedule from disruptions; and crew recovery from disruptions.

In one embodiment, floating fleet server (202), fare estimation server (302) and/or schedule optimization server (306) use a homogenous and/or heterogenous fleet assignment management ("FAM") approach that comprises a model based at least in part on: fleet characteristics, customer demands, for example with respect to legs/trips; a distance matrix; and/or duty constraints. An objective of FAM is to minimize the total flight time for one or more operators using a local search approach.

Local Search for Fleet Assignment.

As fleet assignment comprises the problem of assigning flights to a fleet of aircrafts to minimize some objective function while satisfying certain operational constraints, the objective function is the total travel time, and the constraints include maximum flying time per day and pilot curfews. In one embodiment, models are based on at least one of: mathematical programming such as linear programming and/or constraint programming; and on a local solver paradigm.

Traditionally, aircraft planning generally includes the problem of creating routes for a set of individual aircraft, covering a set of flights in a timetable known as a "tail assignment" or "aircraft routing". The tail assignment problem considers various operational constraints are satisfied while minimizing a cost function. Moreover, tail assignment is a part of a sequential procedure used by airlines to plan their operations.

Traditionally, a first step is modeling of a market behavior to construct a timetable containing information about the time and place of the arrival and departure of each flight. After this step, fleet assignment is performed by assigning an aircraft type to each flight leg to maximize anticipated profit while taking into account the number of available aircrafts. For each aircraft type, an aircraft routing problem is then solved by determining the sequence of flight legs to be flown by each individual aircraft.

Traditionally, the air planning process for commercial airlines involves six steps, in order:
 a. Timetable Construction;
 b. Fleet Assignment;
 c. Crew Pairing;
 d. Crew Rostering;
 e. Aircraft Assignment; and
 f. Recovery Planning.

By contrast, in one embodiment, the timetable construction step is a preprocessing step to flight optimization (306). Timetable construction may comprise generating consistent distance matrix between the locations of the planes bases and live legs. A flight leg in which a customer is transported is sometimes referred to as a "live leg" as opposed to a repositioning leg wherein the plane is empty.

Traditionally, the fleet assignment process assigns an aircraft type to each flight segment in a given flight schedule. This selection is based on factors such as revenue and operating costs, as well as operational constraints.

By contrast, in one embodiment, the allocation of a homogeneous fleet to flights is considered while minimizing the travelled distance, differing from a traditional interpretation of "fleet assignment". Without limitation, the techniques disclosed also generally apply to multiple plane types wherein plane types are assigned to flights as is traditional. Without limitation, the objective function may undergo changes such as handling multiple objectives.

While the processes for planning aircraft types are similar to most operators (204), the aircraft assignment process can significantly differ between operators. Some operators plan the aircraft assignments close to flights departures, while others plan them long in advance. Operators with large fleets of similar aircrafts and with regular schedules over a week manage to perform aircraft assignments very late. By contrast, operators with irregular schedules and many different aircraft types may need to plan aircraft assignments longer in advance. Some operators create preliminary aircraft assignments very early in the planning process. These assignments are used as input to the crew planning process, to assign aircraft to the most profitable multi-leg itineraries, and/or do long-term maintenance planning.

Variations of aircraft assignments mean that many different approaches are traditionally used. A common approach creates aircraft routes, respecting many maintenance constraints and maximizing the possibilities for passengers to use the same aircraft on multi leg itineraries. This approach typically does not consider individual operational constraints. Other approaches are focused only on maintenance feasibility, but few approaches consider more general optimization criteria.

In one embodiment, fleet assignment is considered as an optimization problem; in one embodiment, fleet assignment is considered a feasibility problem, especially for cases where many operational constraints are being considered. A fleet assignment maximizing same-aircraft connections for passengers may be considered as optimization problems. Maintenance planning problems may be considered as feasibility problems. Operators who plan fleet assignment a few days prior to flight departure may consider aircraft assignment as a feasibility problem.

Traditional approaches only address problems occurring in commercial airlines rather than for private aircraft. Fleet assignment for the private aircraft business has distinctive characteristics from the commercial airline business, comprising: fleet planning over a shorter time horizon, for example three days and a 'floating fleet' global optimization problem where the goal is to minimize the total travel time realized by one or more operators (204). In one embodiment, the problem set is defined as a multi-objective optimization problem where the customer preferences would be considered as one of the optimization criteria.

Mathematical Programming.

A first approach for fleet assignment is a basic model which comprises an assignment of customer legs to planes for a homogenous fleet. A second model considers temporal constraints as well, for example not flying more than 10 hours per day. Each problem is solved over a fixed time period, for example a week, month, quarter and/or year.

Linear Programming.

In one embodiment, a fleet assignment problem comprises identifying which aircraft should operate which flight in a given schedule. An assumption is that all flights must be operated by exactly one aircraft. A fleet assignment problem may be considered as a minimum cost flow problem with multiple sources for example departing airports where the planes are located, multiple intermediary nodes for example client legs, and multiple destinations for example arrival airports where the planes should arrive.

Figure 4A:
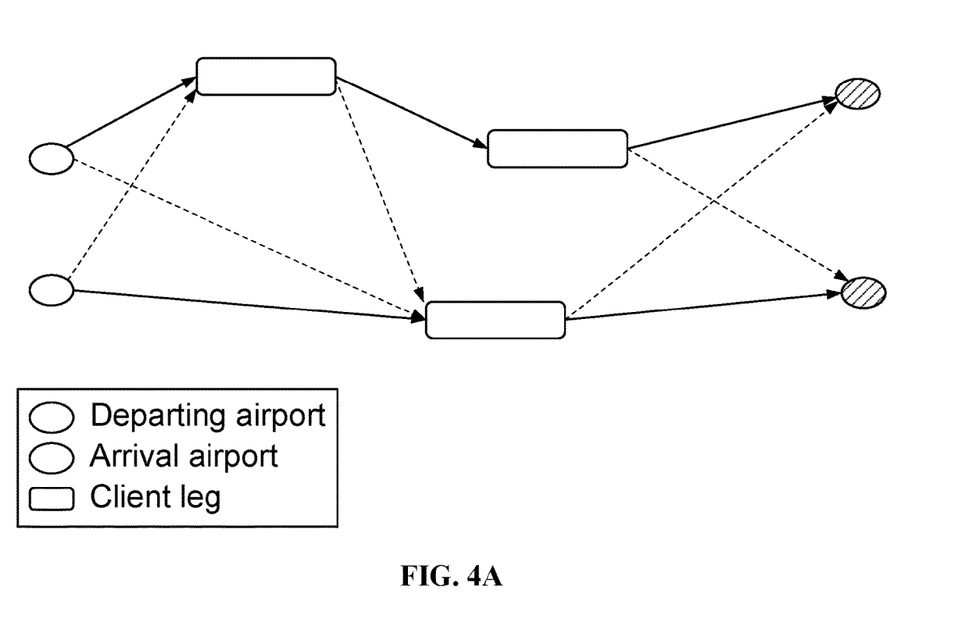
FIG. 4A is an illustration of an embodiment of a network graph in the fleet assignment problem.

FIG. 4A is an illustration of an embodiment of a network graph in the fleet assignment problem. As shown in FIG. 4A, main characteristics of the network comprise:
 a. The network is a directed and connected network;
 b. At least one of the nodes is a supply node; the supply nodes are departing airports in FIG. 4A;
 c. At least one of the nodes is a demand node; the demand nodes are the client leg nodes in FIG. 4A;
 d. Flow through an arc is allowed only in the direction indicated by the arrowhead, where the maximum amount of flow is given by the capacity of the arc; and/or
 e. An objective is to minimize the total travel cost of passing through the network to satisfy the given demand within the intermediary nodes which represent the customer legs.

In one embodiment, a directed and connected network is used wherein the n nodes include at least one supply node for example the starting point of the plane, and at least one demand node for example the arrival point of the plane, as shown in FIG. 4A.

Decision variables for such a model include $x_{ij}$=flow through arc i→j.

Input data and/or given information includes:
 $c_{ij}$=cost of travelling through arc i→j;

$a_i$=cost occurring when passing through the node i; and
$b_i$=net flow generated at node i; wherein
The value of $b_i$ depends on the nature of node i:
$b_i$>0 if node i is a supply node,
$b_i$<0 if node i is a demand node, and
$b_i$=0 if node i is an intermediary node.

One objective is to minimize the total travel cost of the fleet through the network to satisfy the given demand. By using the convention that summations are taken only over existing arcs, a linear programming formulation of this problem may be:

$$\text{Minimize } Z = \Sigma_{i=1}^{n} \Sigma_{j=1}^{n} (c_{ij} + a_j) x_{ij} \quad (1)$$

Subject to $$\Sigma_{j=1}^{n} x_{ij} - \Sigma_{j=1}^{n} x_{ji} = b_i, \text{ for each node } i, \quad (2)$$

$$\Sigma_{j=1}^{n} x_{ij} \geq 1, \text{ for each node } i \text{ where } b_i = 1 \text{ or } 0. \quad (3)$$

The first summation in constraints equation (2) represents the total flow out of node i, whereas the second summation in (2) represents the total flow into node i, so the difference is the net flow generated at this node.

Temporal Model.

In one embodiment, the basic model above is enhanced with temporal constraints requested by real life operations. In one embodiment, this is modeled by a "connection network", where each individual activity-to-activity connection is an arc between two activity nodes. In one embodiment, a connection which is present in the connection network is termed legal, while connections not in the network are illegal. A possible and/or legal route may only contain legal connections.

The use of a connection network gives the possibility to forbid individual connections, so even if a connection seems possible, that is provides sufficient connection time, it may be deemed illegal due to other reasons. In one embodiment, a legal connection exists between two activities if the second activity departs from the same airport as the first one arrives at, and there is sufficient turn time, typically about 30-45 minutes, between arrival and departure times.

The table [1] below shows an example timetable at airport SFO.

TABLE 1

Example Timetable at Airport SFO

| Flight | From | To | Departure | Arrival |
|--------|------|-----|-----------|---------|
| SF100  | LAS  | SFO | 08:00     | 09:30   |
| SF101  | LAS  | SFO | 09:00     | 10:30   |
| SF102  | SFO  | SBA | 11:00     | 12:00   |
| SF103  | SFO  | SBA | 12:30     | 13:30   |
| SF104  | BFI  | SFO | 14:00     | 15:15   |
| SF105  | SFO  | LAX | 15:45     | 16:25   |

Figure 4B:
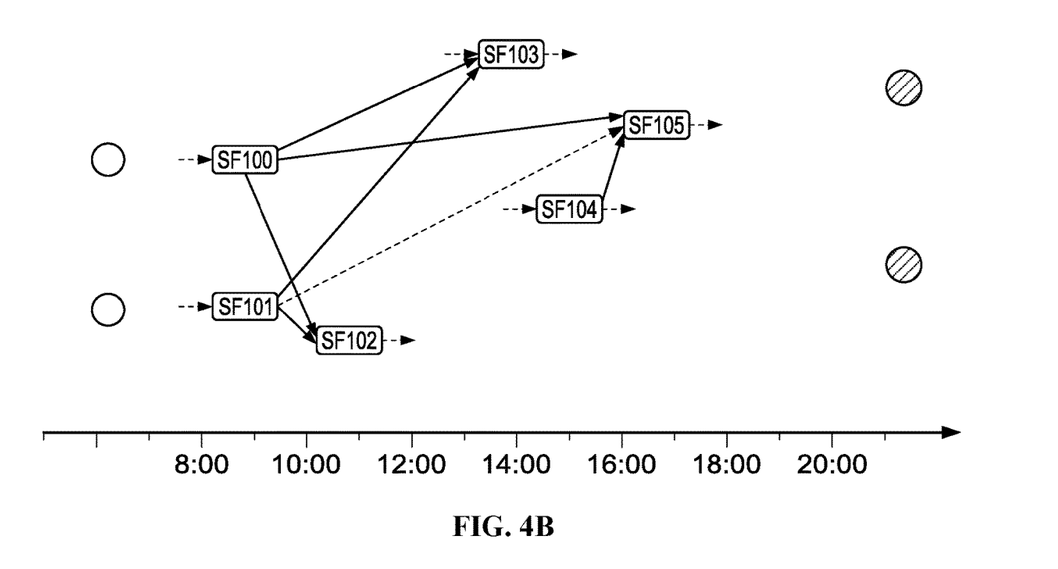
FIG. 4B illustrates an example of a connection network.

FIG. 4B illustrates an example of a connection network. The example of FIG. 4B is for Table [1] assuming 30 minutes connection time.

In one embodiment, flight network representation is expressed as a "time line network". A time line network has a time line for each station, with nodes placed at arriving and departing flights, and the activities represented by vertical arcs between arrival and departure nodes.

Figure 4C:
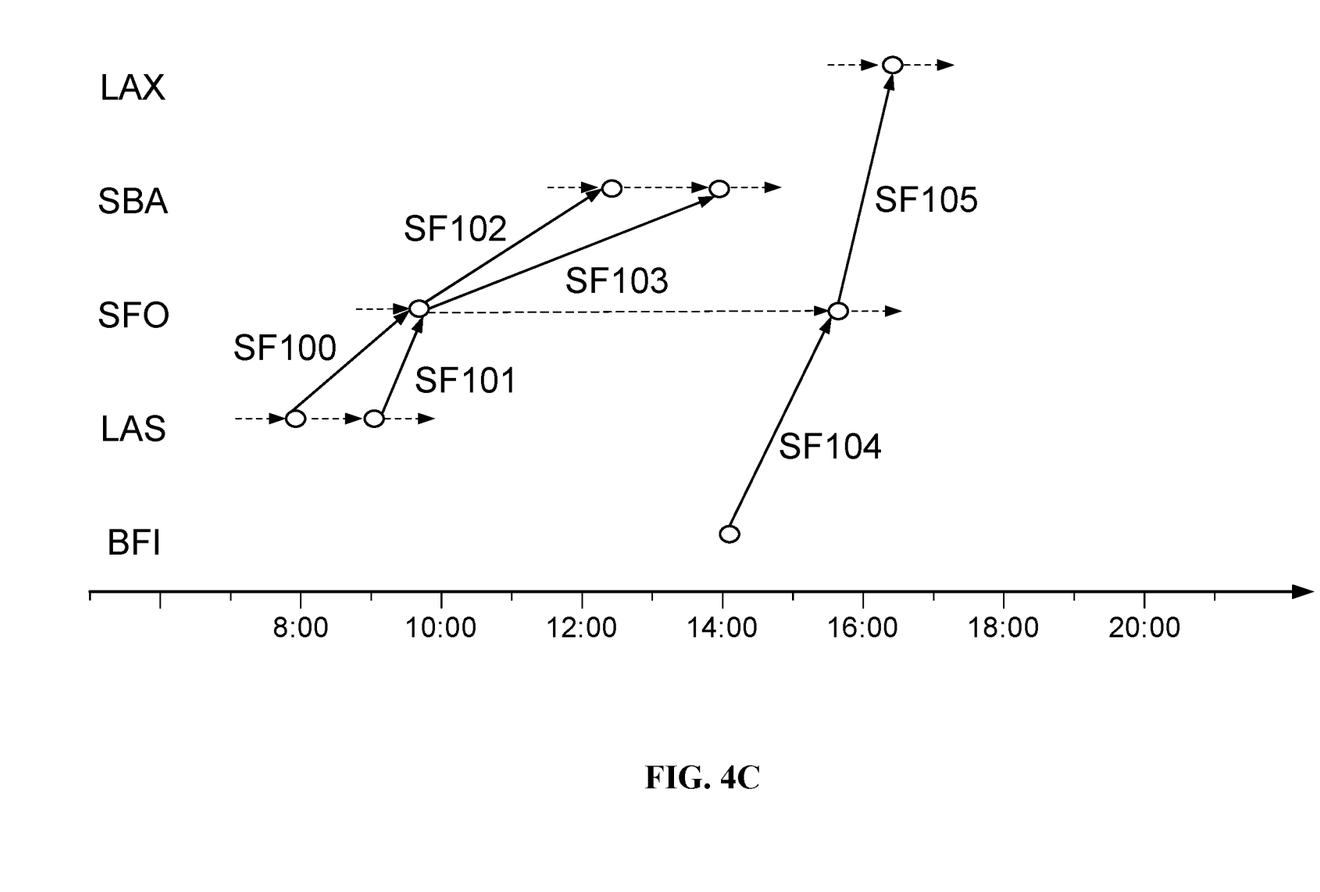
FIG. 4C illustrates an example of a time line network.

FIG. 4C illustrates an example of a time line network. The example of FIG. 4C represents the time line network of the example from Table [1]. The plain arcs in FIG. 4C represent the live legs whereas the dotted arcs represent staying on the ground with a certain cost.

These traditional approaches originated in the context of commercial airlines which have well established networks and do not require dynamic and continuous repositioning of the aircrafts as in the private aircraft business. Thus, the main issue with these approaches is that the repositioning of the flights is not considered within the model. Solving of repositioning either as a preprocessing step or by including the empty legs within the input is disclosed.

In one embodiment, a model considers an airline flight pairing problem. The solution strategy uses constraint programming as a sub-problem algorithm for linear programming column generation. Each column represents the pairing of a potential set of flights to be flown by a crew. Thus, the master problem must find a set of pairings that covers every flight at a minimum cost. This is a particular kind of set covering problem.

In one embodiment, the overall algorithm is controlled by a main block in a flight pairing script. The script starts by generating an initial set of pairings. Then, the problem alternates between solving the linear programming relaxation of the set covering problem and solving a pairing generation problem that produces new columns for the master problem. When the columns are satisfactory, the columns are fixed and the set covering problem is solved to find the integer optimal solution. Finally, the flight pairing script prints the pairing used for each flight.

In one embodiment, the constraint programming sub-problem is a focus. A "flight pairing" is defined as a set of flights that start and end at a crew base and that satisfy a set of schedule constraints. Constraint programming may be used to enumerate potential flight pairings. In the initialization stage, a set of pairings may be enumerated that are guaranteed to cover every flight. In the column generation phase, the constraint program may be used twice: First, to determine the optimal flight pairing with respect to the current set of dual multipliers; and second to add this optimal pairing to a set of randomly-generated pairings whose cost is better than, or equal to, the cost of the optimal pairing. In one embodiment, the result is a large set of entering columns and may eliminate one of the major weaknesses of column generation: the large number of iterations needed to improve the objective value in the master problem.

Local Search Programming Approach.

Using a local solver proposes an alternative solving approach by attempting to solve a range of problems from small or large, combinatorial or numerical, linear or nonlinear. It combines different optimization techniques for solving: local search, constraint propagation and inference, linear and mixed-integer programming, as well as nonlinear programming.

In one embodiment, a basic model proposed for a local solver approach is equivalent to the linear programming model proposed in the previous section. A goal is to assign client orders, representing live legs, to the planes of a fleet so that the total travel cost is minimized, as shown in Table [2] below:

TABLE 2

Basic model for a local solver.

Input nbPlanes ( integer): Number planes in the fleet
nbOrders (integer): Number orders representing the clients live legs requests
nbNodes (integer) ← nbPlanes (Origin Base) + nbOrders + nbPlanes (Destination Base): The total number of nodes in the network
HotelAirportTime (double): The time from hotel to airport (For now, it is generic for all the airports.)
TaxiTime (double): The taxi time at the airport ( This is also generic for all the airports)

TABLE 2-continued

Basic model for a local solver.

Duration (vector of nbOrders): duration of the flight leg at each node in minutes
OriginTime (vector of nbOrders): the start time of the live leg at each node
DestinationTime (vector of nbOrders): the end time of the live leg at each node
nodeType (integer): There are three node types: source (the nodes representing the depart sites of the planes), intermediary (the nodes representing the live legs and their origin/destination locations), and sink (the nodes representing the arrival locations/bases of the planes)
c ( matrix of nbNodes$^2$ integers): the travel cost matrix between all locations Variables X of size nP$^2$ in {0, 1}: ∀(i1, i2) ∈ [1 . . . nP]$^2$
$X_{i,j}$ = 1 ⇔ The arc between node i and node j Objective Minimize the total traveled time by all the planes in the fleet
Cout = $\Sigma_{i=1}^{n} \Sigma_{j=1}^{n}(c_{ij} + Duration_j)x_{ij}$ In one embodiment, a second model is used as an enhancement of the basic model of Table [2], wherein one or more time constraints are also considered:
a. In any 24 hour period, a crew may not fly a plane more than 10 hours, measured between $t_{off}$ and $t_{on}$;
b. In any 24 hour period, a crew may not be on duty more than 14 hours; and/or
c. In every 24 hour period, there must be a continuous period of at least 10 hours during which the crew is not on duty.

In one embodiment, the local solver model duty constraints are modelled by considering any pair of legs (i,j). For each pair the duty constraints are modelled based on expressions assigned to each node. At each node the cumulate flight time may be calculated based on the following formula:

CumulFlightTime[i]=LegFlyingTime[i]+
$\Sigma_{j\ in\ successors[i]}$TransferTime[i][j]*x[i][j]+
$\Sigma_{k\ in\ predecessors[i]}$CumulFlightTime[k]*x[k][i])    (4)

Moreover, the variables Plane[i] may be defined at each node of the network in order to be able to identify which plane is passing through the node. These variables are than used in order to identify if two nodes distant in time by more of 24 h and passed through by the same plane have the difference in cumulated times smaller than 10 h. The Plane[i] variables may be defined as follows:

Plane[i]=$\Sigma_{k\ in\ predecessors[i]}$Plane[k]*x[k][i])    (5)

In order to fulfill the 10 h flight time constraint three situations may be considered. For each pair of nodes (i, j), DestinationTime$_j$−OriginTime$_i$<24 h (OriginTime$_j$−OriginTime$_i$<24 h)

Constraint: CumulTime[i]<10    (6)

Constraint:

FlightTime[i]+TransferTime[i][j]+(OriginTime$_i$+24−OriginTime$_j$)<10    (9)

DestinationTime$_j$−OriginTime$_i$>24 h and OriginTime$_j$−OriginTime$_i$<24 h

Constraint: Plane[i]!=Plane[j] or CumulFlight[j]−CumulFlight[i]<=10    (10)

The second constraint relates to the duty time constraints. The following expressions may be defined at each node of the network.

CumulDuty[i]=HotelAirportTime+TaxiTime+LegFlyingTime[i]+TaxiTime+$\Sigma_{j\ in\ successors[i]}$(TransferTime[i][j]+TaxiTime)*x[i][j]+$\Sigma_{k\ in\ predecessors[i]}$(CumulDutyTime[k]*x[k][i])    (11)

These constraints may be modelled in a similar way as the flight time constraints by considering the following:

DestinationTime$_j$−OriginTime$_i$<24 h (OriginTime$_j$−OriginTime$_i$<24 h)

Constraint: CumulDuty[i]<14    (12)

Constraint:

FlightTime[i]+TransferTime[i][j]+(OriginTime$_i$−24−OriginTime$_j$)<14    (15)

A third constraint may ensure that there exists a time interval of at least 10 hours in every 24 h periods. To that goal a constraint may be imposed that for every pair of two legs (i, j) with DestinationTime$_j$−OriginTime$_i$>24 h, there should exist a waiting time WaitingTime[i][j]>10 h.

In order to model this constraint the variables WaitingTime at each node of the network are introduced. The WaitingTime variables are defined as follows:

WaitingTime[i]=0, for the source nodes i

WaitingTime[i]=OriginTime[i]−$\Sigma_{k\ in\ predecessors[i]}$((DestinationTime[k]+c[k][i])*x[k][i])    (16)

A Boolean variable may be defined at each node of the network as:

waitMoreThan10 hours[i]<−waitingTime[i]>10    (17)

In one embodiment, for each node's start of the current Shift, the end of the current Shift is defined as follows: a ShiftStart[i] expression on each node given the end of the last off-duty period for the crew.

Thus for each node:
prevShiftStart[i] expression on each node represents the start of the shift (based on the precessors and x[k][i]:

prevShiftStart[i]=OriginTime[i], for the source nodes I    (18)

prevShiftStart[i]=$\Sigma_{k\ in\ predecessors[i]}$((prevShiftStart[k]*x[k][i]), for all other nodes    (19)

currentShiftEnd[i] expression on each node represents the end of the shift and is defined as follows:

currentShiftEnd[i]=$\Sigma_{k\ in\ predecessors[i]}$((DestinationTime[k]+c[k][i])*x[k][i]), if waitMoreThan 10 Hours[i]=true    (20)

currentShiftEnd[i]=DestinationTime[i] if waitMoreThan10 Hours[i]=false    (21)

shiftStart[i] expression on each node represents the beginning of the shift and is defined as follows:

shiftStart[i]=OriginTime[i] if waitMoreThan10 Hours[i]=true shiftStart[i]=prevShiftStart[i] if waitMoreThan10 Hours[i]=false    (22)

The constraint then may be written as follows:

currentShiftEnd[i]−shiftStart[i]<24−10    (23)

In this previous model, the assumption was made that the repositioning flight is realized immediately after the first leg of a connection. This assumption might prevent from finding better solutions in terms of reduced cost.

In another enhanced model, a more general model does not consider the aforementioned assumption. This model allows for repositioning between two legs X & Y based on one or more of the following strategies:

The repositioning flight is realized immediately after the leg X if the sum of the cumulated duty time at leg X and the repositioning time is smaller than 14 h;

If the repositioning time window (minus the repositioning time) is more than 14 h and smaller than 28 h then a waiting time of 14 h is placed between the leg X and repositioning flight whereas there the rest of the waiting time is put between the repositioning leg and leg Y; and/or If the repositioning time window minus the repositioning time is greater than 28 h than all possibilities are explored for the waiting times before and after repositioning. (either W_B=0 & W_A=rest of the time window, or W_A=0 & W_B=rest of the time window, or W_B=W_A>=14).

Variables defined include W_B (waiting Time before repositioning) and W_A (waiting time after repositioning) for each time window between two legs X and Y. Temporal variables are defined as:

$$\Delta = \text{Origin\_Y} - \text{Destination\_X}$$

$$W\_B = \text{Origin\_R} - \text{Destination\_X}$$

$$W\_A = \text{Origin\_Y} - \text{Destination\_R}$$

The rules to be included into the model are as follows: Consider the following rules for determining when to reposition:

If Δ−repos_time<=14 h (may be 10 h in some embodiments) then
  W_B=0
  W_A=Δ−repos_time
  CumulFlight_Y=CumulFlight_X+FlightTime_reposXY+FlightTime_Y
  CumulDuty_Y=CumulDuty_X+FlightTime_Y
If 14 h<=Δ−repos_time<=28 h then
  If CumulFlight_X+FlightTime_reposXY>10 h
    W_B=14
    W_A=Δ−repos_time−W_B
    CumulFlight_Y=FlightTime_Y+repos_time
    CumultDuty_Y=Aeroport_Y+Taxi_Y*2+FlightTime_Y
  Else
    W_B=0
    W_A=Δ−repos_time
    CumulFlight_Y=CumulFlight_X+FlightTime_reposXY+FlightTime_Y
    CumulDuty_Y=Aeroport_Y+Taxi_Y*2+CumulDuty_X+FlightTime_Y
If Δ−repos_time>=28 h then
  If CumulFlight_X+FlightTime_reposXY>10 h
    W_B=14
    W_A=Δ−repos_time−W_B
    CumulFlight_Y=FlightTime_Y+repos_time
    CumulDuty_Y=Aeroport_Y+Taxi_Y*2+repos_time
  Else
    W_B=0
    W_A=Δ−repos_time
    CumulFlight_Y=CumulFlight_X+FlightTime_reposXY+FlightTime_Y
    CumulDuty_Y=Aeroport_Y+Taxi_Y*2+CumulDuty_X+FlightTime_Y
  Else
    W_A=W_B=(Δ−repos_time)/2
    CumulFlight_Y=FlightTime_Y+repos_time
    CumulDuty_Y=Aeroport_Y+Taxi_Y*2+repos_time+FlightTime_Y In one embodiment, the Local Search Programming Approach provides a best mode for the solution, in that, the Mathematical Programming Approach as some features needed may be hard to model and/or solving times were too slow.

Conclusion on Fleet Assignment.

As described above, the fleet assignment problem can been seen as an optimization problem or as a feasibility problem. One goal is to develop solution methods which can both obtain feasible solutions quickly, and close to optimal solutions, when more time is available. Solutions methods thus are developed based on mathematical programming and local search programming. The mathematical programming solver may use one of three approaches: a node based model; an arc based model; and a model based on constraint programming combined with linear programming column generation.

To determine which solution method to use includes considering simulation issues: temporal constraints and plane relocation. These two issues increase the complexity of solving the fleet assignment problem. Traditional mathematical programming models do not consider the relocation aspect as they were developed for commercial airlines and are complex.

A summary of simulation models and empirical observations indicate mathematical programming is extremely efficient for simulations without temporal constraints, but for many private aircraft models where relocation is needed to be considered the mathematical programming simulation may slow or run out of memory:

|  | Without temporal constraints | With temporal constraints |
|---|---|---|
| Without aircraft relocation | Mathematical programming and/or Local search | Mathematical programming |
| With aircraft relocation | Mathematical programming and/or Local search | Local search |

Management server.

Management server (308) may provide features, components, and operations of a marketplace to purchase transportation provided via private aircraft.

In one embodiment, this is presented as a cloud-based, multitenant platform (202) to support a comprehensive set of commercial operations capabilities that allow at least one of the following: automated pricing; availability; aircraft scheduling; commercial operations workflow; quoting for a customer (206); contracts; and/or online payments.

In one embodiment, commercial operations capabilities may comprise at least one of the following:

a. Automated pricing and revenue management but supporting quotes automatically and in real-time. In one embodiment, a multiuser, rules-based distortion-aware pricing engine (302) is provided that offers capabilities for operators (204) to automatically quote all aircraft in fleet. These capabilities include at least one of the following:

i. The ability to access the availability, route the aircraft, calculate flight performance, and price the trip;

ii. Availability to support configurable, rule-defined conditions and criteria for pricing, costing, time, tax, and terms & conditions, including at least one of the following:
  1. Type of customer (206);
  2. Flight Date Effective rules;
  3. Origin/Destination airport pricing criteria;
  4. Departure/Arrival, by Day of Week and Time of Day criteria;
  5. Aircraft type and class criteria;
  6. Aircraft tail number criteria;
  7. Trip type criteria;
  8. Leg type criteria;
  9. Minimum/Maximum value limits at the Leg, Trip, and Itinerary levels;
  10. Airport or Route Grouping criteria; and/or
  11. Costing criteria to calculate revenue margins;
iii. Simultaneously accommodating multiple pricing schemes including:
  1. Point-to-point pricing;
  2. Back-to-base pricing; and/or
  3. Transient aircraft pricing;
iv. Prioritizing pricing rules;
v. Determining automatically the price efficiency of flying roundtrips as two trips versus a single trip (faring) commonly used to reduce trips with excessive minimum charges;
vi. Customized grouping of airports and aircraft for use in all rule type definitions;
vii. Restriction of aircraft options generated based on geography, airport, and other performance and operational criteria;
viii. Generation of Federal Excise Tax (FET) charges including overwater segments to Alaska (AK)/Hawaii (HI) from any airport in the continental U.S., segment taxes, rural airports, head taxes for AK/HI, and the 225 Mile Zone;
ix. Estimation of flight times and endurance based on actual historical flight performance data for an operator's (204) specific tail numbers. An operator (204) may choose to automatically allow the server (202) to access historical flight performance criteria automatically or can be modified by operator (204);
x. Incorporation of accurate seasonal winds data based on the most recent, licensed Boeing Wind/Temperature models;
xi. Ability to check flight performance factors;
xii. Sorting and filtering of pricing options based on multiple consumer criteria; and/or
xiii. Displaying rules and data used to generate pricing options;

b. Automated proposal workflow and autogenerated email proposals. In one embodiment, offering workflow for sales teams to track flight requests, search for aircraft options, create customized proposals, and confirm booking and payment for their customers (206). Filtering and sorting allows a scheduler or charter sales person to find and select options from their fleet for each customer request (206) with the ability to bookmark specific options, generate and track multiple proposals for the same trip request, adjust final pricing, generate customized quotes, and add custom messaging to the customer proposal (206). Proposals are automatically generated in email formats (supporting PC, Mac, iPad, and Mobile formats) with operator (204) branded HTML email formatting. Emailed proposals also support one or more aircraft options with dynamic links to allow the customer (206) to sign contracts and pay online from the emailed quotes;

c. Online customer (206) contracts and payments. In one embodiment, allowing customers (206) to sign contracts online, establish and save their preferred payment method online, and book directly from the automatically generated system email quote, including at least one of the following:
  i. Online paperless booking, contracts, and payments workflow. Once a customer (206) has selected an aircraft option that they would like to book and purchase, they may be directed to an operator-branded (204) customer website to complete the booking and submit payment for the trip. Using this cobranded payments and contracts website, a customer (206) can create an account in the cobranded website and review all proposed aircraft options and itinerary details, including aircraft photographs, amenities, and operator (204) safety ratings, and then complete the booking, contract, and payment process fully online; and/or
  ii. Support for multiple online payments types. Customers (206) may choose to store their payment details with their account in a digital wallet. Once stored, they can be reused another time for any operator (204a . . . 204m) on the network. All electronic payments processed may be handled in a PCI compliant manner. Multiple online payment types may be supported including: Visa and MasterCard; American Express; Discover Card; ACH (Automated Clearing House bank transfer); and wire transfers;
  iii. A proprietary payment method to support online payments. Consumers can set up an account, with funds preloaded directly from their personal or corporate bank account, and pay online to any operator (204). Customer funds are stored in a separate restricted account with a bank, refundable at any time, and secured under appropriate governmental license;
  iv. Automated calculation and payment to the U.S. Treasury of FET and segment fees; and/or
  v. Contract management system. Operators (204) may upload and maintain their current terms and conditions for charter on the platform (202). Terms and Conditions may be presented to customers (206) via the customer contracts and payment cobranded website as part of booking. Contracts may be digitally signed as well as downloaded and printed for reference by the customer (206) if desired;

d. Dynamic aircraft scheduling and collaboration, including at least one of the following:
  i. HTML5 or other suitable web technology dynamic fleet scheduling and visibility. Trips booked on an operator's fleet (204) may be displayed in an interactive schedule board with drilldown capabilities. Live legs, dynamically generated repositioning legs, maintenance events, owner trips and/or other non-charterevents can be created directly from the scheduleboard to update schedule availability. Various types of trips may be color-coded for ease of management and visibility. The aircraft schedule is dynamically linkable to customer (206), aircraft, and airport information;
  ii. Optional integration with Rockwell Collins FOS®. If Rockwell Collins Air Routing International's ARINCDirect Flight Operations System (FOS®) is integrated directly with platform (202) for real-time schedule availability and booking, then schedule data is refreshed on an operator (204) configurable basis (from 30 second intervals to any desired interval), with builtin error and event logging handling, and any trip booked in the system (202) is automatically pushed back into FOS® as a quote request and a note is added to the calendar to visually block aircraft availability until the booking can be confirmed in FOS®'s schedule;

iii. CRM and customer account database integration. Operator (204) and/or customer (206) account information may be stored in a database/store for platform (202) and accessed during quoting workflow or for reference;

iv. Operator (204) alerting system. A built-in alerting system may notify users in realtime of critical trip related events/disruptions such as new requests, bookings and cancellations; and/or v. Advanced analytics and business intelligence. The system (202) may come integrated with an analytics and business intelligence platform. Operator (204) data can be displayed in configurable dashboards directly incorporated into platform (202), providing data on sales activity, fleet utilization and organizational performance;

e. Fleet and airport integrated database, including at least one of the following:

i. Fleet aircraft database. Aircraft photographs, performance data, amenities, crew requirements and baggage capacity can be viewed, downloaded and edited in a console for platform (202). In addition, performance data for aircraft types in an operator's fleet (204) may also be viewed. This type of data is used as the default for performance calculations by the pricing engine if tail specific data is not available from operator (204).

ii. Airport reference database. The system (202) may be integrated with third-party databases to provide worldwide airport and fixed base (204) operator (FBO)/handler data for reference from within the server (202).

Figure 5A:
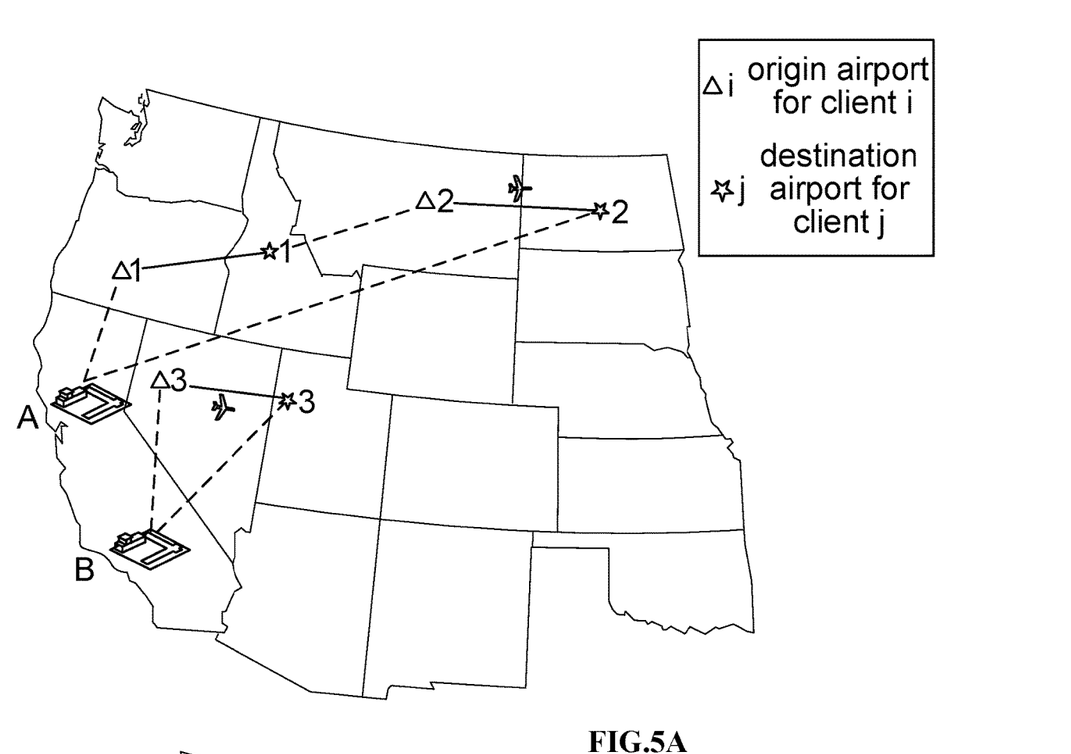
FIGS. 5A and 5B illustrate an example of disruption cost use.
Figure 5B:
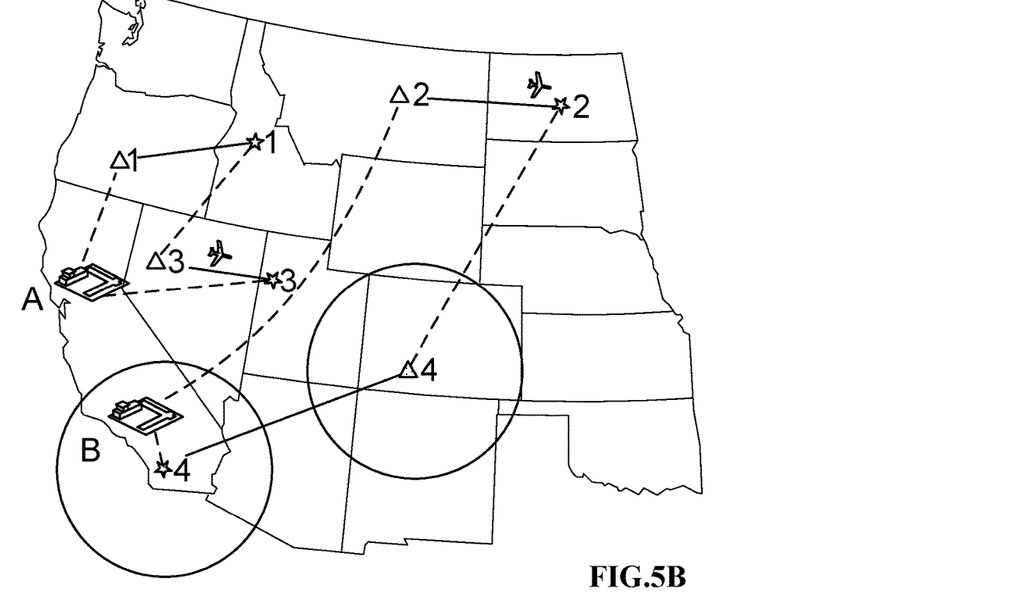

FIGS. 5A and 5B illustrate an example of disruption cost use. The disruption cost of a fleet of planes induced by a trip may be considered the difference between the total operational cost of the fleet's schedule with and without that trip. Thus, by minimizing the operational cost of the fleet's schedule with that trip, the disruption cost induced by the trip may also be minimized.

In one embodiment, the optimization process may include assigning the repositioning legs to different aircraft in order to connect the client legs. As an alternative to using an optimization process and/or module (306) to consider and minimize repositioning and/or other disruption costs across a fleet, the cost of each potential repositioning leg in every feasible schedule may be determined by complex rules, similar to those used to price live legs. By contrast, to consider and minimize the disruption costs associated with repositioning legs via an optimization process, simple cost formulas may be used because they are more efficient, more timely, and/or less resource hungry than complex rules and because they are accurate enough for the optimizer to find a schedule that minimizes the disruption cost.

Once an optimization module (306) determines the minimum disruption cost for a new proposed trip, the pricing module uses this disruption cost, along with many other factors, for example ruled-determined direct costs of live legs, airport waits, and so on, to determine a proposed price/quote for the requested trip.

In FIG. 5A a flight schedule is shown for two aircraft, one "A" based in San Francisco and "B" based in Los Angeles. Originally, aircraft "A" serves client 1 and client 2, wherein each trip/leg is shown with a triangle_i for an origin airport for customer i, and a star_j for a destination airport for customer j. Originally, aircraft "B" serves customer 3.

In FIG. 5B, a customer 4 places a request and the schedule of the whole fleet is optimized accordingly according to the disruption cost induced by the insertion of client 5 into the trajectory. The new schedule results in allocating the client 3 to aircraft "A" after the client 1 service, whereas the client 4 is served prior to client 2 by aircraft "B". This implies an increase in the total flight cost due to insertion of client 4 into the aircraft "B" schedule and the exchange of the client 2 and client 3 between the schedules, and the return to each respective base for the two aircraft.

It may be observed that when optimization is applied over one or more operators (204), the problem becomes complex as the insertion of a new customer (206) may imply other clients' relocation and/or exchange among the aircrafts' schedules. In one embodiment, such complexity is addressed at least in part by decomposing the rule-based pricing and optimization-derived cost components, that is the disruption cost, as described herein.

In one embodiment, the optimization module (306) deals with this combinatorial problem based on efficient local search optimization algorithms, which currently are solved in the timeframe of a few seconds, for the insertion of a new client (206), or minutes, for the optimization from scratch of the whole set of (206), for problems up to for example 100 planes and 400 clients.

By combining a rules-based pricing engine, total fleet operational disruption cost calculation, and fleet schedule optimization to determine quotes/prices for every individual client trip request, it is now possible to determine and quote more accurately a cost/price for a requested itinerary, including by consider disruption costs across a one or more operators (204), virtually integrated fleets, while avoiding the complexity and potential resource consumption problems that would be present using a purely rule-based approach.

Figure 6:
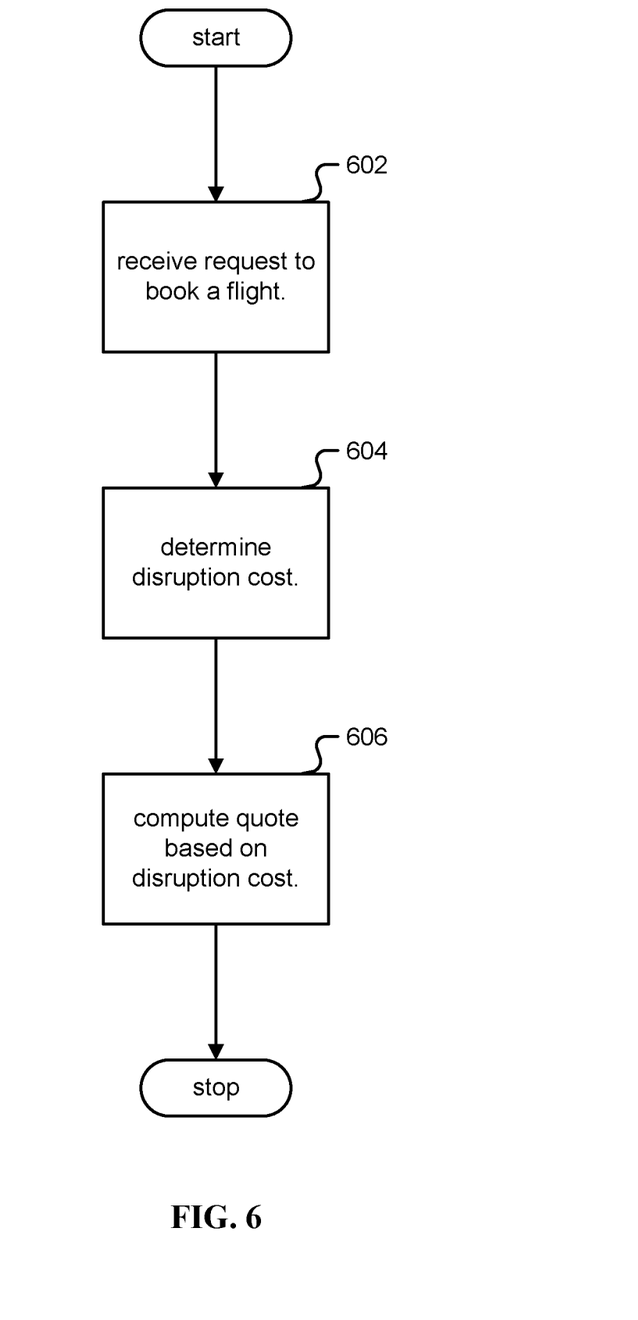
FIG. 6 is a flow chart illustrating an embodiment of a process for a floating fleet.

FIG. 6 is a flow chart illustrating an embodiment of a process for a floating fleet. In one embodiment, the process of FIG. 6 is carried out by floating fleet server (202) in FIG. 2.

In step 602, a request is received to book a flight on a private aircraft. In one embodiment, the request originates from a customer (206). In one embodiment, the request is received via a network, for example the Internet.

In step 604, a disruption cost is determined for the new flight. In one embodiment, the disruption cost determined is associated with adding the flight to a previously optimized schedule of previously booked flights.

In step 606, a quote is computed at least in part by incorporating the disruption cost. In one embodiment, this quote is related to a price to be quoted to book the requested flight.

In an optional step after step 606 (not shown), the system (202) may compute a new optimized schedule in the event the requested flight is booked. In one embodiment, optimization processes are computed with an optimization server (306) based on at least one of the following: an optimization module; an optimization model, and an optimization process.

In one embodiment, price is computed based on a pricing module (302), and the new optimized schedule is computed in an optimization module (306) distinct from the pricing module (302). In one embodiment, the optimization module (306) comprises an insertion mode to compute a local optimization of the flight from the previously optimized schedule.

In one embodiment, the optimization module (306) comprises a global mode to compute a global optimization of the flight and all other existing flights without requiring a consideration of the previously optimized schedule.

In one embodiment, the pricing module (302) is based at least in part on a set of pricing rules. In one embodiment, the set of pricing rules include at least one of the following: a fuel cost rule, a distance rule, and an airport cost rule. In one embodiment, the pricing module (302) is based at least in part on the disruption cost. In one embodiment, the disruption cost is computed as the difference between a total previous cost associated with the previously optimized scheduled and a total current cost associated with the new optimized schedule. In one embodiment, the price is based at least in part on a back-to-base price for a destination associated with the flight.

In one embodiment, the optimization module (306) computes optimization across a plurality of operators and/or private aircraft fleets. For example, at least two of the plurality of operators (204) may be associated with different owner entities. In one embodiment, the system (202) communicates with a plurality of operators (204), wherein each operator of the plurality of operators is associated with a private aircraft fleet. In one embodiment, pricing module (302) is configured to estimate fare price to maximize revenue for a given operator. In one embodiment, the optimization module (306) comprises computation of fleet assignment. In one embodiment, the optimization module (306) comprises computation of crew scheduling. In one embodiment, wherein the optimization module (306) and/or disruption management module (310) comprises a forecast of future disruptions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to receive via a network a request to book a flight on a private aircraft; and
a processor coupled to the communication interface and configured to:
receive the request to book the flight;
determine a disruption cost associated with adding the flight to a previously optimized schedule of previously booked flights, comprising to:
compute the disruption cost based on a difference between a total previous cost associated with the previously optimized schedule and a total current cost associated with a new optimized schedule, wherein the new optimized schedule is computed in an optimization module distinct from a pricing module, wherein the optimization module comprises A) an insertion mode to compute an insertion of the flight to the previously optimized schedule based on a local search optimization algorithm or B) a global mode to compute a global optimization of the flight and other existing flights without requiring a consideration of the previously optimized schedule, and wherein an optimized schedule relates to minimized repositioning costs across a fleet;
compute based at least in part on the disruption cost a price to be quoted to book the requested flight, wherein the price is computed based on the pricing module; and
book the flight.

2. The system of claim 1, wherein the pricing module is based at least in part on a set of pricing rules.

3. The system of claim 2, wherein the set of pricing rules include at least one of the following: a fuel cost rule, a distance rule, and an airport cost rule.

4. The system of claim 2, wherein the pricing module is based at least in part on the disruption cost.

5. The system of claim 1, wherein the price is based at least in part on a back-to-base price for a destination associated with the flight.

6. The system of claim 1, wherein the optimization module computes optimization across a plurality of operators.

7. The system of claim 6, wherein at least two of the plurality of operators are associated with different owner entities.

8. The system of claim 7, wherein the communication interface is further configured to communicate with a plurality of operators, wherein each operator of the plurality of operators is associated with a private aircraft fleet.

9. The system of claim 7, wherein the pricing module is configured to estimate fare price to maximize revenue for a given operator.

10. The system of claim 1, wherein the optimization module comprises computation of fleet assignment.

11. The system of claim 1, wherein the optimization module comprises computation of crew scheduling.

12. The system of claim 1, wherein the optimization module comprises a forecast of future disruptions.

13. A method, comprising:
receiving a request to book a flight on a private aircraft;
determining a disruption cost associated with adding the flight to a previously optimized schedule of previously booked flights, comprising:
computing the disruption cost based on a difference between a total previous cost associated with the previously optimized schedule and a total current cost associated with a new optimized schedule, wherein the new optimized schedule is computed in an optimization module distinct from a pricing module, wherein the optimization module comprises A) an insertion mode to compute an insertion of the flight to the previously optimized schedule based on a local search optimization algorithm or B) a global mode to compute a global optimization of the flight and other existing flights without requiring a consideration of the previously optimized schedule, and wherein an optimized schedule relates to minimized repositioning costs across a fleet;
computing based at least in part on the disruption cost a price to be quoted to book the requested flight, wherein the price is computed based on the pricing module; and
booking the flight.

14. A computer program product, the computer program product being embodied in a tangible non-transitory computer readable storage medium and comprising computer instructions for:

receiving a request to book a flight on a private aircraft;
determining a disruption cost associated with adding the flight to a previously optimized schedule of previously booked flights, comprising:
computing the disruption cost based on a difference between a total previous cost associated with the previously optimized schedule and a total current cost associated with a new optimized schedule, wherein the new optimized schedule is computed in an optimization module distinct from a pricing module, wherein the optimization module comprises A) an insertion mode to compute an insertion of the flight to the previously optimized schedule based on a local search optimization algorithm or B) a global mode to compute a global optimization of the flight and other existing flights without requiring a consideration of the previously optimized schedule, and wherein an optimized schedule relates to minimized repositioning costs across a fleet;
computing based at least in part on the disruption cost a price to be quoted to book the requested flight, wherein the price is computed based on the pricing module; and
booking the flight.

* * * * *